(12) United States Patent
Nakazawa

(10) Patent No.: US 11,094,217 B1
(45) Date of Patent: Aug. 17, 2021

(54) PRACTICE APPARATUS

(71) Applicant: Synca-Outfit NQ co., Ltd., Tokyo (JP)

(72) Inventor: Hideta Nakazawa, Tokyo (JP)

(73) Assignee: SYNCA-OUTFIT NQ Co., Ltd., Tokyo (JP)

( * ) Notice: Subject to any disclaimer, the term of this patent is extended or adjusted under 35 U.S.C. 154(b) by 0 days.

(21) Appl. No.: 17/035,868

(22) Filed: Sep. 29, 2020

(30) Foreign Application Priority Data

Mar. 31, 2020 (JP) .............................. JP2020-063547

(51) Int. Cl.
*G09B 15/08* (2006.01)
*G09B 15/02* (2006.01)

(52) U.S. Cl.
CPC ........... *G09B 15/08* (2013.01); *G09B 15/023* (2013.01)

(58) Field of Classification Search
CPC ............................. G09B 15/08; G09B 15/023
See application file for complete search history.

(56) References Cited

U.S. PATENT DOCUMENTS

| | | | | |
|---|---|---|---|---|
| 6,037,534 A * | 3/2000 | Yasutoshi | ............... | G09B 15/04 84/423 R |
| 7,582,825 B2 * | 9/2009 | Chien | ..................... | G09B 15/08 84/477 R |
| 8,008,563 B1 * | 8/2011 | Hastings | ................ | G09B 15/04 84/479 A |
| 8,445,767 B2 * | 5/2013 | Brow | .................... | A63F 13/814 84/609 |
| 9,685,096 B2 * | 6/2017 | Ng | ........................ | G10H 1/0066 |
| 10,629,175 B2 * | 4/2020 | Yan | ........................ | G10H 1/344 |
| 10,825,432 B2 * | 11/2020 | Yan | ....................... | G10H 1/0033 |
| 2014/0251114 A1 * | 9/2014 | Yoshikawa | .......... | G09B 15/023 84/478 |

FOREIGN PATENT DOCUMENTS

JP        4670557        4/2011

* cited by examiner

*Primary Examiner* — Robert W Horn
(74) *Attorney, Agent, or Firm* — Ryan Alley IP

(57) ABSTRACT

A practice apparatus includes a light source device that emits light beams in different colors to keystroke positions on a keyboard or a keystroke object with keystroke positions that imitates a keyboard, fluorescent paper pieces that are respectively attached to the fingers of a player and have different colors for different fingers, and a main device that has a storage unit for storing therein music information on music and a transmitting unit for transmitting, to the light source device, a signal relating to the colors of the light beams, which depend on the colors of the fluorescent paper pieces attached to the fingers of the player, and the timing of emitting the light beams, based on the music information stored in the storage unit.

3 Claims, 6 Drawing Sheets

PRACTICE APPARATUS

RELATED APPLICATIONS

This application claims priority under 35 U.S.C. § 119 to Japanese Application 2020-063547, filed Mar. 31, 2020. This JP application is incorporated by reference herein in its entirety.

BACKGROUND

Field

The embodiments discussed herein relate to a practice apparatus.

There is known an apparatus that is attached to a keyboard instrument without a performance training function and that is configured to teach key depression positions. For example, there is known a performance training apparatus that is attached to a keyboard instrument to teach how to play the keyboard. This performance training apparatus includes light emitting means respectively corresponding to the keys of the keyboard, a key depression instructing means that causes the light emitting means to emit light beams to keys to be depressed according to the note-on events of music data used for performance training, to indicate the key depression positions, and a detecting means for detecting the performance on each key on the basis of reflected light beams to the light beams emitted to the keys of the keyboard.

Please see, for example, Japanese Patent No. 4670557.

Such a performance training apparatus needs to be attached to a keyboard instrument. Therefore, without any keyboard instrument, the performance training apparatus is unable to teach key depression positions.

SUMMARY

To accomplish the above problem, there is provided a practice apparatus including: a light source device that emits light beams in different colors to keystroke positions on a keyboard or a keystroke object with keystroke positions, the keystroke object imitating the keyboard; fluorescent paper pieces that are respectively attached to fingers of a player, the fluorescent paper pieces having different colors for different fingers; and a main device including a storage unit and a transmitting unit, wherein the storage unit stores therein music information on music, and the transmitting unit transmits, to the light source device, a signal relating to colors of the light beams, which depend on the colors of the fluorescent paper pieces attached to the fingers of the player, and timing of emitting the light beams, based on the music information stored in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION

Figure 1:
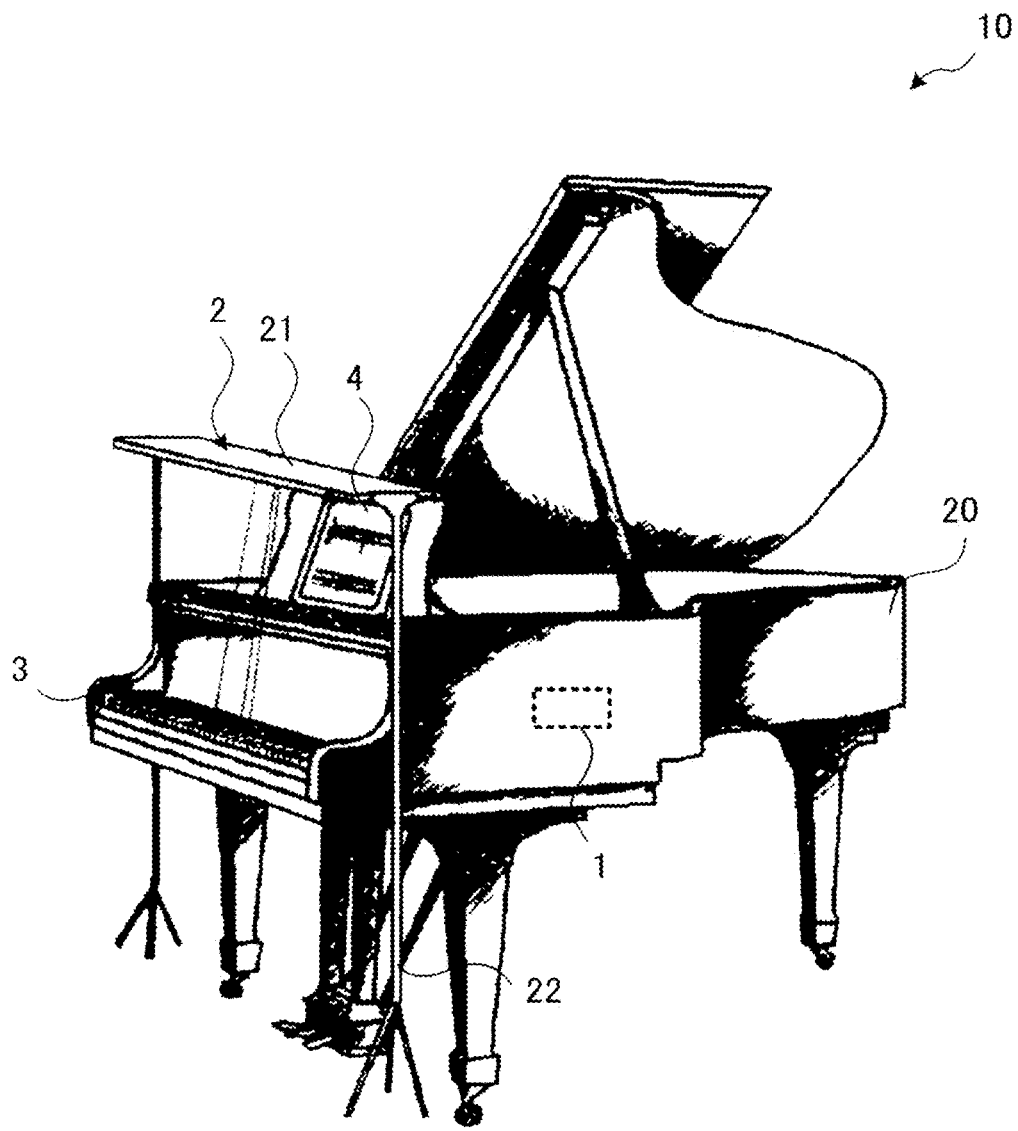
FIG. 1 illustrates a practice apparatus according to one embodiment.

Hereinafter, a practice apparatus according to embodiments will be described in detail with reference to the accompanying drawings.

For easy understanding of the present invention, the position, size, shape, range, and others of each component illustrated in the drawings may not represent the actual position, size, shape, range, and others. Therefore, the present invention is not limited to the illustrated positions, sizes, shapes, ranges, and others.

Elements that are each represented as singular in the embodiments may be plural in use, unless otherwise particularly specified in writing.

EMBODIMENT

To play the piano, a player needs to read music scores. Then, he/she needs to use his/her fingers to press the keyboard keys of the piano according to the notes of a music score. As music becomes more complex, beginners find it difficult to move their fingers and also find it hard to play music exactly as written on a music score.

It is well known that people who have a reputation as world-famous pianists have done a lot of work on piano and music scores since young and have achieved success as outstanding musicians through practice and more practice.

At the beginning of piano studies, even those who are now outstanding pianists were not that different from those who play the piano in their free time. However, how to work on the piano after that make them different.

In general, people who learn piano prepare piano books like Bayern and Hannon and practice the piano with teachers. Only those who are gifted kids can take special lessons from famous piano teachers. In addition to this, it is a necessary condition to spend a considerable amount of time practicing the piano.

At present, however, some simple methods are available for improving piano skills. One of them is an inexpensive electronic piano for beginners, which lights up keys in matching with a music programmed in the piano. A player moves his/her fingers according to the light. There are also a number of free applications using smartphones and/or personal computers. Youtube (registered trademark) provides videos that let a player play a keyboard as a pianist plays. These methods are useful only for skilled piano players to do practice, but are too difficult for beginners.

In addition, consider that such a video does not show music scores. If the video plays a simple music, a player might memorize the music by repeatedly watching the video. However, if the video plays a famous classic piano music, it is not impossible for the player to move their fingers as the video shows, unless he/she is a skilled piano player.

In all ages, it is sure that practice under piano teacher's guidance is an orthodox learning method. However, it also requires economic allowance as a necessary condition. Now, consider what kinds of steps an absolute beginner needs to take to get to the point where he/she can play music, starting with sitting at the piano and playing the keyboard. Beginners do not know what key makes what sound. The musical scale of modern western music is based on one octave starting with a keynote and ending at a keynote, that is, a famous Do Re Mi Fa So La Ti Do in Italian, and is a rule for music intervals. A music score is created by arranging notes on staff notation on the basis of the music notation using musical symbols (symbols, letters, and numbers), and a sound flow that constantly varies and does not stop even for a moment is not able to be seen or understood until it is represented on a music score. In the case of the piano, every beginner needs to practice playing Do Re Mi Fa So La Ti Do smoothly with their fingers so that the players can learn what note on a music score corresponds to what key sound of the keyboard of the piano, with their eyes and ears.

With the practice apparatus of the embodiment, players, from beginners who are unable to read music scores to skilled piano players, find it easy to play keyboards with their fingers through practice and also learn successive matching between notes of a music score and piano sounds with fingers, eyes, and ears while seeing a monitor. Through practice using this apparatus, the players become able to play the piano only from music scores. This eliminates the need of face-to-face lessons with piano teachers, and also relaxes restrictions put in practice time and practice place and reduces economic burden for expensive tuition fees.

The following describes a practice apparatus according to one embodiment.

FIG. 1 illustrates a practice apparatus according to the embodiment.

The practice apparatus of the embodiment includes a main device (computer) 1, a light source device 2, a keyboard 3, and a monitor 4.

The main device 1 stores therein music information generated by digitalizing music. The main device 1 is electrically connected to the light source device 2, keyboard 3, and monitor 4 and has a function of controlling these.

Figure 2:
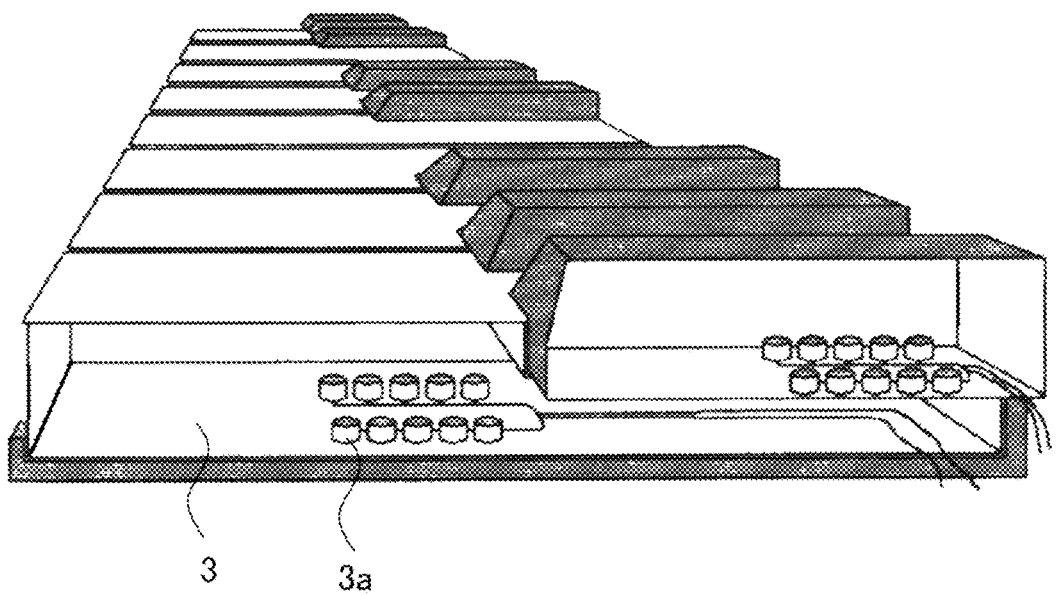
FIG. 2 is a view for explaining a keyboard according to the embodiment.

FIG. 2 is a view for explaining a keyboard according to the embodiment.

The keyboard 3 of the embodiment is a keyboard with a total of 88 keys, 52 white and 36 black, which a piano 20 has. Alternatively, a keyboard with keystroke positions, which imitates a keyboard, may be used, for example. Yet alternatively, a keyboard written on paper, which does not allow keystrokes (i.e., keys cannot be pressed down), may be used, for example.

The keyboard 3 is electrically connected to the main device 1. The keyboard 3 has a shape that imitates the 88 keyboard of a piano. Ten LEDs 3a in ten different colors are embedded in each key. The keyboard 3 has a sensor device (not illustrated) that is able to detect, when a key is pressed, how long and how much strength the key is pressed. The keyboard 3 outputs, to the main device 1, a digital signal for sounds according to the detection result obtained by the sensor device.

The light source device 2 is electrically connected to the main device 1. The light source device 2 includes a main body 21 and a support part 22 that supports the main body 21. The main body 21 is located above the keyboard 3.

The main device 1 controls light emitting and blinking of the light source device 2.

Figure 3:
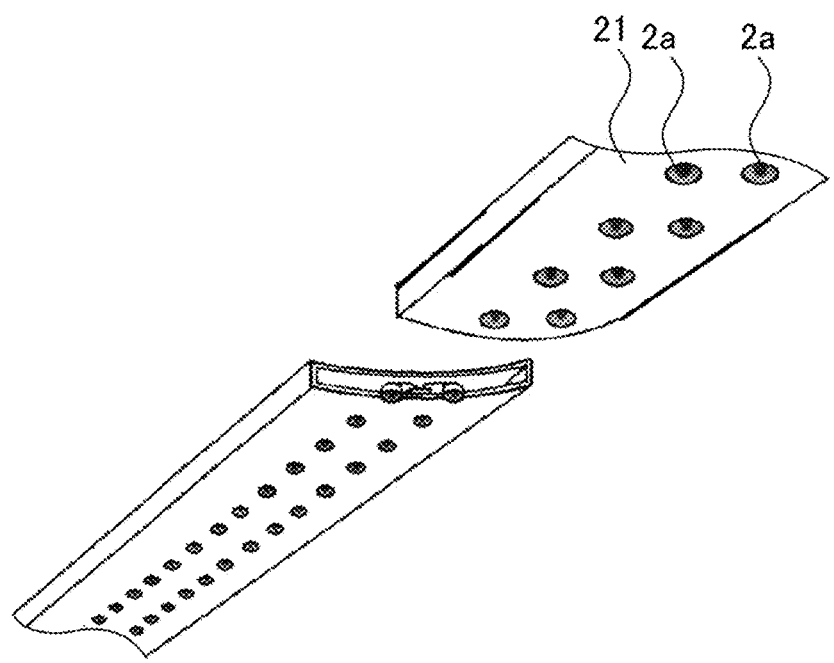
FIG. 3 is a view for explaining a light source device according to the embodiment.

FIG. 3 is a view for explaining a light source device according to the embodiment.

The main body 21 is provided with a plurality of light sources 2a that emit light beams to the keyboard 3. The light sources 2a respectively correspond to the 88 keys in total of the keyboard: 52 white and 36 black, and are arranged in two lines. The light sources 2a have one-to-once correspondence with the keys of the keyboard 3.

Examples of the light sources 2a include light sources that emit laser light beams, light emitting diodes (LEDs) that emit high-luminance light beams, and others. Each light source 2a is able to change the color of a light beam (hereinafter, referred to as a colored light beam) to one of the ten colors. A desired number of colors may be set for the light beams.

Refer now back to FIG. 1.

The monitor 4 is electrically connected to the main device 1. A music score of music information may be displayed on the monitor 4. The monitor 4 displays notes of the music score corresponding to keys of the keyboard 3 currently lit up with colored light beams, in the same colors as the corresponding colored light beams.

Figure 4:
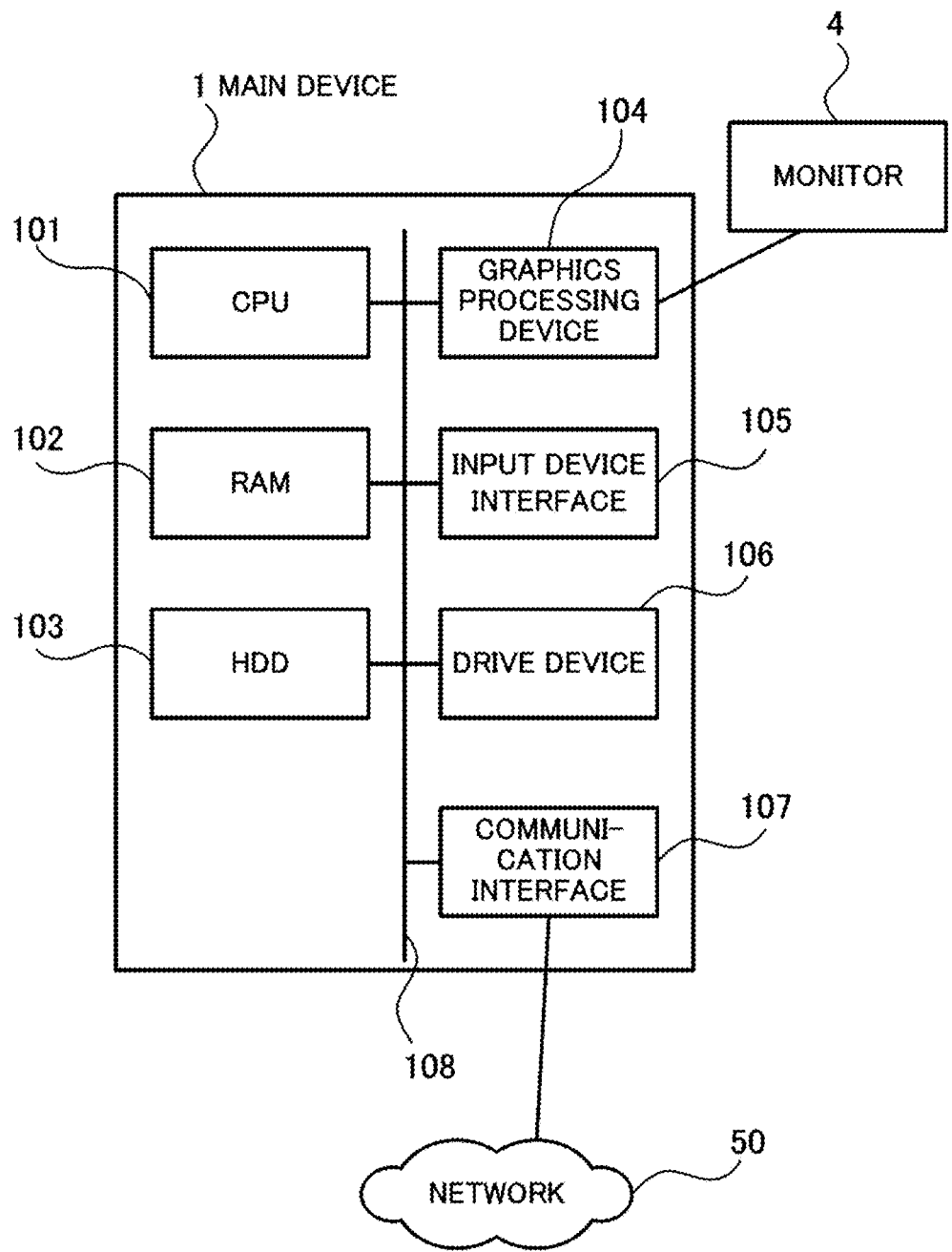
FIG. 4 illustrates a hardware configuration of a main device according to the embodiment.

FIG. 4 illustrates a hardware configuration of a main device according to the embodiment.

The main device 1 is entirely controlled by a central processing unit (CPU) 101. A random access memory (RAM) 102 and a plurality of peripheral devices are connected to the CPU 101 via a bus 108.

The RAM 102 is used as a main storage device of the main device 1. The RAM 102 temporarily stores therein at least part of operating system (OS) programs and application programs that are executed by the CPU 101. In addition, the RAM 102 stores therein various kinds of data to be used by the CPU 101 in processing.

Connected to the bus 108 are a hard disk drive (HDD) 103, a graphics processing device 104, an input device interface 105, a drive device 106, and a communication interface 107.

The hard disk drive 103 magnetically performs data write and read on a built-in disk. The hard disk drive 103 is used as an auxiliary storage device of the main device 1. The OS programs, application programs, and various kinds of data are stored in the hard disk drive 103. A semiconductor storage device, such as a flash memory, may be used as an auxiliary storage device.

The graphics processing device 104 is connected to the monitor 4. The graphics processing device 104 displays images on the screen of the monitor 4 in accordance with instructions from the CPU 101. Examples of the monitor 4 include a display device using a cathode ray tube (CRT), a liquid crystal display, and others.

The input device interface 105 has a touch panel. The input device interface 105 gives signals received from the touch panel to the CPU 101. In this connection, the touch panel is one example of pointing devices, and another kind of pointing device may be used. Examples of other pointing devices include a mouse, a keyboard, a tablet, a touch pad, a track ball, and others.

The drive device 106 reads data from, for example, a portable storage medium such as an optical disc, on which data is recorded so as to be readable with reflection of light, or a universal serial bus (USB) memory. For example, in the case where the drive device 106 is an optical drive device, data recorded on an optical disc may be read with laser light or the like. Examples of the optical disc include a Blu-ray (registered trademark), a digital versatile disc (DVD), a DVD-RAM, a compact disc read only memory (CD-ROM), a compact disc recordable (CD-R), a compact disc rewritable (CD-RW), and others.

The communication interface 107 is connected to a network 50. The communication interface 107 communicates data with other computers and communication devices over the network 50.

With the above hardware configuration, the processing functions of the present embodiment may be implemented.

The following describes the structure and functions of the practice apparatus 10.

Figure 5:
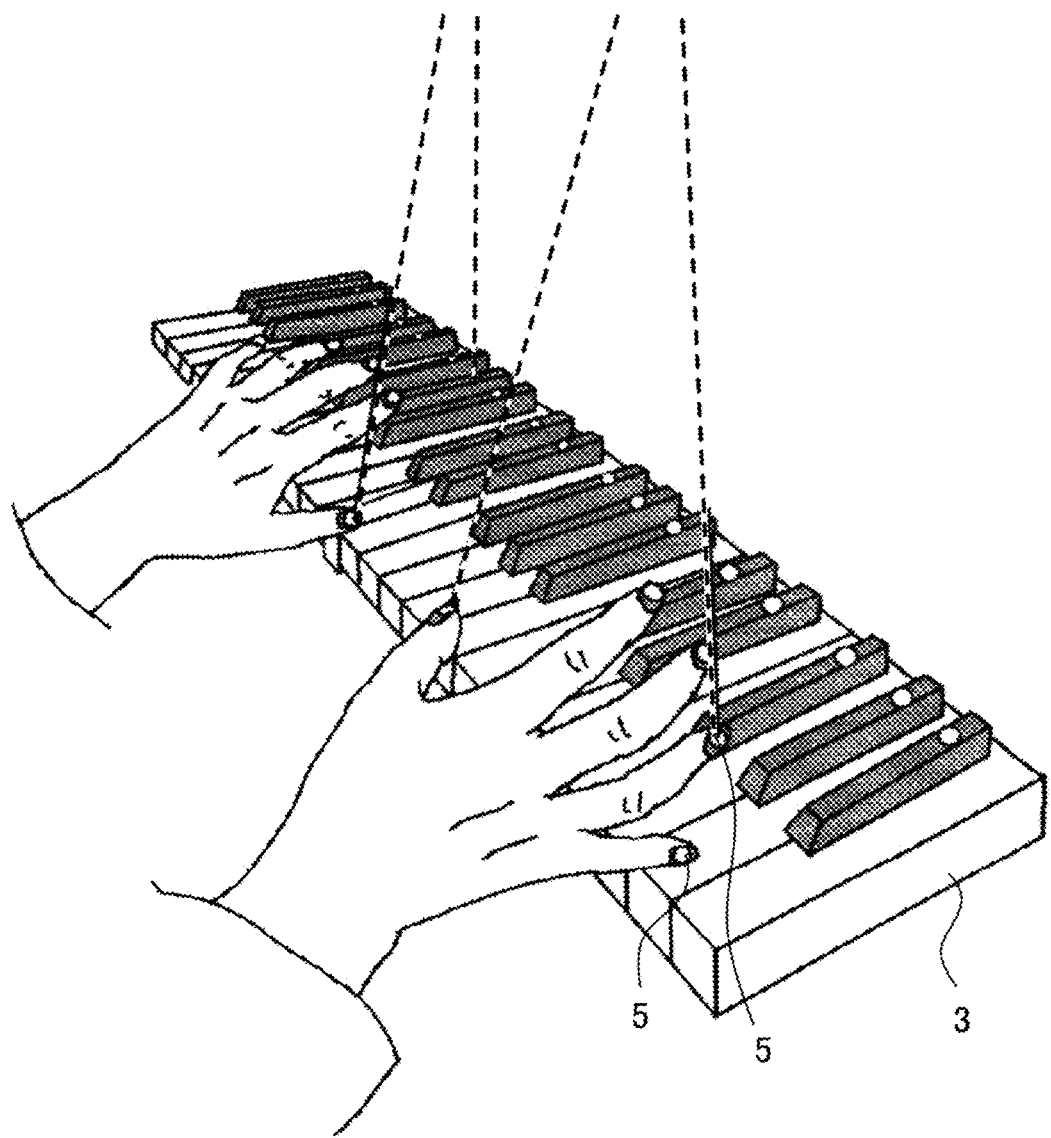
FIG. 5 is a view for explaining the functions of a practice apparatus according to the embodiment.

FIG. 5 is a view for explaining the functions of a practice apparatus according to the embodiment.

Fluorescent paper pieces 5 in (ten) different colors are respectively attached to the nails of a player who uses the practice apparatus 10. It is possible to decide in advance what colored fluorescent paper piece 5 is attached to what finger (for example, red for right thumb, yellow for right pointing finger, or the like). Information indicating what colored fluorescent paper piece 5 is attached what finger is stored in the main device 1.

With respect to the notes of music scores, finger numbers may be given to indicate what fingers to use to press the corresponding keys. That is, how to shift finger positions on the keyboard is fixed.

As described above, digitalized music information is previously stored in the main device 1. The main device 1 controls what colored light beams to emit to what keys on the keyboard (the pitch of sound), among the 88 light sources provided in the light source device 2 and how long (the length of sound), according to the music information and information indicating what colored fluorescent paper pieces 5 are attached to what fingers. More specifically, the main device 1 outputs to the light source device 2 a digital signal for emitting, to keystroke positions, light beams in the same colors as fluorescent paper pieces 5 attached to fingers with the same finger numbers as given to individual notes of the music information. For example, with respect to a note to be played by a right thumb, a red light beam is emitted. This digital signal is designed to include information designating a color, a key to which a light beam is emitted, and timing of emitting the light beam.

The light source device 2 emits colored light beams to designated keys (the pitch of sound) for a designated period of time (the length of sound) according to the digital signal received from the main device 1.

By successively pressing keys lit up with colored light beams, with fingers, a player is able to play music programmed in the main device 1. While fingers with the same finger numbers as indicated in a music score correctly press keys on the keyboard, the fluorescent paper pieces 5 in ten colors attached to the nails of the fingers that play music becomes brighter since the fluorescent paper pieces 5 have the same colors as the colored light beams lighting up the keys.

If a key on the keyboard 3 is pressed with a finger with a finger number different from that indicated in the music score on the keyboard 3, this means that the color of the fluorescent paper piece 5 on the finger is different from that of an emitted light beam on the key. Therefore, the fluorescent paper piece 5 changes its color to darker or to a color different from the original color of the fluorescent paper piece 5 on the finger. Therefore, the player is able to confirm a correct keystroke position easily, which enhances practice effect.

Matching or nonmatching in color is one of identification information indicating whether playing is correct or not. Another condition may be used to indicate correct playing. For example, colored light beams have different colors from the fluorescent paper pieces 5, but each colored light beam is designed to change its color to be brighter when the fluorescent paper piece 5 of a finger with the same finger number as indicated in a music score is correctly on the keyboard, and the main device 1 is designed to output, to the light source device 2, a digital signal for emitting such colored light beams to keystroke positions.

Further, the main device 1 is so designed as to cause the LEDs 3a to emit light beams in the same color as colored light beams emitted by the light source device 2.

Here, the problem is whether a beginner is able to move his/her ten fingers as indicated by a music score. To deal with this, the main device 1 has a function of adjusting the length (light emission rhythm) for emitting colored light beams to the keyboard 3. This rhythm may be set by a player. By doing so, for example, the player is able to set a relatively long emission of colored light beams in the main device 1 first, and as the player improves his/her performance skills, he/she may shorten the length for emission. Even the beginners become able to play music at the same pace as indicated by a music score.

In addition, the music score of a music piece is displayed on the screen of the monitor 4 connected to the main device 1. Therefore, with a program that displays notes in the same colors as colored light beams according to a digital signal transmitted by the main device 1, even beginners who have not gotten used to music scores are able to confirm with their eyes the matching between their fingers on the keyboard and the notes of a music score. By practicing playing the keyboard, a player who is unable to read music scores at all gradually get used to reading the music scores, and become able to play the piano only from the music scores through practice.

Further, an artificial intelligence-based performance analysis program installed in the main device 1 may analyze the keystroke positions, keystroke speed, and keystroke strength of a player and tell the differences between the notes of a music score and the sounds in a human voice, as if a piano teacher were teaching the player. This method does not allow players to do inappropriate practice or dull practice, which likely occurs in self-study, but keeps them doing appropriate practice without getting them tired.

As described above, the practice apparatus 10 of the embodiment includes the light source device 2 that emits light beams in different colors to keystroke positions on the keyboard 3 or a keystroke object with keystroke positions, which imitates the keyboard, the fluorescent paper pieces 5 that have different colors for different fingers and are attached to the fingers of a player, and the main device 1 that includes the storage unit storing therein music information on music and the transmitting unit that transmits, to the light source device 2, a signal relating to the colors of light beams, which depend on the colors of the fluorescent paper pieces attached to the fingers of the player, and the timing of emitting the light beams, on the basis of music information stored in the storage unit. Therefore, it is possible to teach keystroke positions, even without any keyboard instrument.

Second Embodiment

The following describes a practice apparatus according to a second embodiment.

Hereinafter, with respect to the practice apparatus of the second embodiment, different features from the above-described first embodiment will be mainly described and the description of the same features is omitted.

Figure 6:
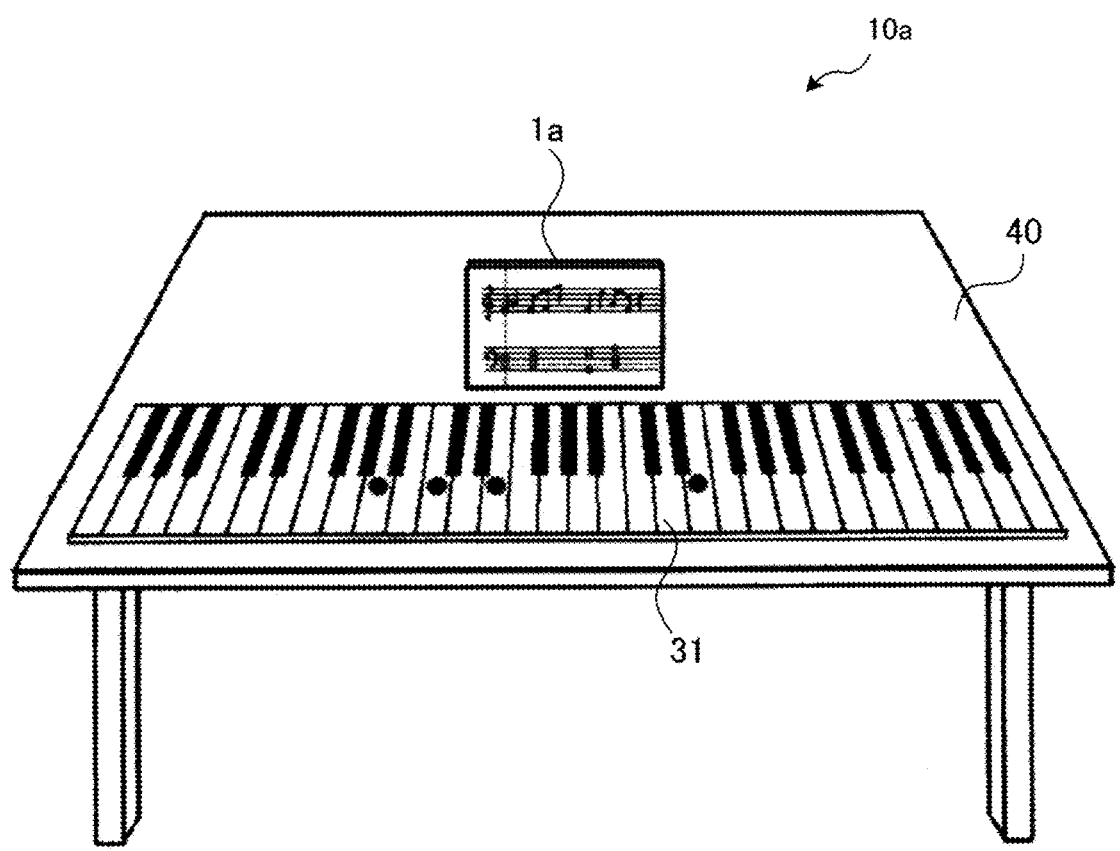
FIG. 6 is a view for explaining a practice apparatus according to a second embodiment.

FIG. 6 is a view for explaining a practice apparatus according to the second embodiment. In this connection, the illustration of a light source device 2 is omitted.

The practice apparatus 10a illustrated in FIG. 6 has an 88 board 31 without keys that can be pressed down, in place of the piano 20 illustrated in FIG. 1. In addition, the practice apparatus 10a includes a main device 1a integrally formed with the monitor 4.

A player is able to place the 88 board 31 and main device 1a on a table 40 and does practice.

The practice apparatus 10a of the second embodiment provides the same effects as the practice apparatus 10 of the first embodiment. The practice apparatus 10a, particularly, the 88 board 31 of the second embodiment greatly relaxes restrictions put in practice time and practice place and also greatly reduces economic burden for preparing a substitute for a piano.

Heretofore, the practice apparatuses have been described with respect to the embodiments illustrated. The embodiments are not limited thereto, and the components of each unit may be replaced with other components having equivalent functions. In addition, other desired configurations and steps may be added to the embodiments.

Further, two or more desired configurations (features) in the above-described embodiments may be combined.

The above-described processing functions may be implemented by using a computer. In this case, a program is prepared, which describes processes for the functions of a practice apparatus 10, 10a. A computer implements the above-described processing functions by executing the program. The program describing the intended processes may be recorded on a computer-readable storage medium. Computer-readable storage media include magnetic storage devices, optical discs, magneto-optical storage media, semiconductor memories, and others. The magnetic storage devices include HDDs, flexible disks (FDs), magnetic tapes, and others. The optical discs include DVDs, DVD-RAMs, CD-ROMs, CD-RWs, and others. The magneto-optical storage media include magneto-optical disks (MOs) and others.

To distribute the program, portable storage media, such as DVDs and CD-ROMs, on which the program is recorded, may be put on sale. Alternatively, the program may be stored in the storage device of a server computer and may be transferred from the server computer to other computers over a network.

A computer which is to execute the above program stores in its local storage device the program recorded on a portable storage medium or transferred from the server computer, for example. Then, the computer reads the program from the local storage device, and runs the program. The computer may run the program directly from the portable storage medium. Also, while receiving the program being transferred from the server computer over a network, the computer may sequentially run this program.

In addition, the above-described processing functions may also be implemented wholly or partly by using a digital signal processor (DSP), an application-specific integrated circuit (ASIC), a programmable logic device (PLD), or other electronic circuits.

According to one aspect, it is possible to teach keystroke positions, even without any keyboard instrument.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A practice apparatus, comprising:
a light source device that emits light beams in different colors to keystroke positions on a keyboard or a keystroke object with keystroke positions, the keystroke object imitating the keyboard;
fluorescent paper pieces that are respectively attached to fingers of a player, the fluorescent paper pieces having different colors for different fingers; and
a main device including a storage unit and a transmitting unit, wherein the storage unit stores therein music information on music, and the transmitting unit transmits, to the light source device, a signal relating to colors of the light beams, which depend on the colors of the fluorescent paper pieces attached to the fingers of the player, and timing of emitting the light beams, based on the music information stored in the storage unit.

2. The practice apparatus according to claim 1, wherein the main device transmits the signal for emitting, to a keystroke position, a light beam in a color that is identical to a color of a fluorescent paper piece attached to a finger with a finger number given to a note of the music information.

3. The practice apparatus according to claim 1, further comprising a display unit that displays notes of a music score according to a flow of the music in such a manner that each of the notes is displayed in a color identical to a color of a corresponding light beam on the keyboard.

* * * * *